Patented May 15, 1934

1,958,529

UNITED STATES PATENT OFFICE 1,958,529

BASIC PRODUCT FROM IMINO ETHERS OF HIGHER FATTY ACIDS AND PROCESS OF MAKING IT

Max Bockmühl, Frankfort-on-the-Main-Hochst, and Robert Knoll, Hornau in Taunus, Germany, assignors, by mesne assignments, to Winthrop Chemical Company, Inc., New York, N. Y., a corporation of New York No Drawing. Application March 13, 1929, Serial No. 346,804. In Germany March 19, 1928

10 Claims. (Cl. 260—44)

The present invention relates to condensation products of imino ethers of higher fatty acids with diamino compounds and to a process of making them.

We have found that imino ethers of higher fatty acids may be condensed with diamino compounds in a smooth way, whereby basic products are formed. By condensing for instance, an imino ether with a diamine of the type of the ethylendiamine, compounds of a cyclic constitution are obtained, evidently according to the following equation:

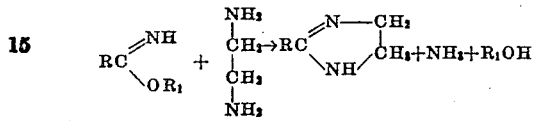

wherein R stands for an aliphatic hydrocarbon radical with at least 10 carbon atoms and $R_1$ stands for alkyl or aralkyl.

The process may also be applied to diamino-alcohols, such as for instance 1.3-diamino-2-hydroxypropane, whereby likewise cyclic bodies are formed.

Alkylated diamino-compounds may also be used as starting materials for the condensation. When starting, for instance, from alkylated di-amino-alcohols, for example, from 1-dialkyl-amino-2-hydroxypropylamines, cyclic compounds are obtained, in which the oxygen evidently participates with the ring formation.

Also diamino-compounds of the type of amino-alkyl-guanidines may be condensed with the said imino ethers to form basic products.

When condensing the imino ethers with the said diamino compounds, the free bases may be used as well as their salts. Preferably the condensation is carried out in a solvent such as alcohol.

The new compounds being water-soluble in the form of their salts, are intended to be used in therapeutics and for technical purposes. Preferably their salts are to be used, into which the condensation products can easily be transformed or which are formed by using the salts of the imino ethers as starting material.

The following examples serve to illustrate the invention, but they are not intended to limit it thereto.

1. 7.5 gr. of the hydrochloride of stearic acid imino ethyl ether are dissolved in 100 cc. of absolute alcohol and mixed with 1.5 gr. of ethylen diamine-hydrate. The mixture is heated for 3 hours to 60° C.–70° C., ammonia being evolved. After the alcohol has been distilled off in vacuo, the hydrochloride of the new compound remains in a solid state. By re-dissolving it from a mixture of alcohol and acetone, the compound is obtained in the form of crystals melting at 123° C. to 125° C. By treating it with an alkali the free base of the following formula:

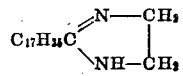

is obtained which crystallizes from acetone in the form of laminæ melting at 93° C. to 95° C. The acetate melts at 70° C.

2. 5.9 gr. of the hydrochloride of stearo imino ethyl ether are dissolved in 70 cc. of absolute alcohol, 2.5 gr. of 1-diethylamine-2-hydroxypropylamine are added to the solution and the mixture is allowed to stand for 3 days at ordinary temperature. After the solvent has been evaporated a yellowish oil remains, which on addition of acetone, solidifies into crystals. The product is readily soluble in water and on addition of an alkali the free base of the following formula:

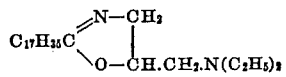

separates.

3. 32 gr. of the hydrochloride of palmito imino ethyl ether are suspended in 200 cc. of absolute alcohol; after addition of 8 gr. of ethylendiamine the temperature is kept for 5 hours at 60° C.–80° C. After distillation of the alcohol, the hydrochloride of the new compound remains. When re-crystallized from acetone, it forms white laminæ melting at 122° C.–123° C. When treated with an alkali, the free base of the following formula:

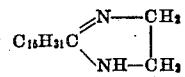

is obtained which when recrystallized from acetone melts at 93° C.

4. 32 g. of the hydrochloride of palmito imino ethyl ether are suspended in 200 cc. of absolute alcohol. After addition of 14.6 gr. of γ-diethyl-amino-β-hydroxypropylamine the whole is heated in a reflux apparatus for 6–8 hours. After distillation of the solvent the new compound remains as a thick oil which, however, soon solidifies. By boiling the aqueous solution with an alkaline solution, the base is obtained as a fat-like mass melting at 38° C.–39° C. It has the following formula:

$$C_{15}H_{31}C\begin{array}{c}N-CH_2\\ \diagup\\ \diagdown\\ O-CH.CH_2.N(C_2H_5)_2\end{array}$$

The dihydrochloride forms fine needles melting at 156° C., and is readily soluble in water.

5. 4.8 gr. of the hydrochloride of palmitic acid imino ethyl ether are suspended in 15 cc. of absolute alcohol and after addition of 1.7 g. of ortho-diamino-cyclohexane, the whole is heated in a reflux apparatus for 5 hours. The alcohol being distilled off, the new compound remains in a solid state. By re-crystallization from acetone-alcohol, it is obtained in the form of white laminæ melting at 161° C.–163° C. The free base obtained by a treatment with alkali corresponds to the following formula:

$$C_{15}H_{31}C\begin{array}{c}N\text{------}CH\\ \diagup\qquad\quad |\\ \diagdown\qquad\quad |\\ NH\text{---}CH\end{array}\begin{array}{c}CH_2\\ |\\ CH_2\\ |\\ CH_2\\ |\\ CH_2\end{array}$$

As equivalents of the salts of the imino ethers their free bases may be used as starting material; the resulting basic condensation products are then to be transformed into their salts.

We claim:

1. The process which comprises causing a salt of an imino ether of a higher fatty acid of the general formula:

$$R-C\begin{array}{c}\diagup NH\\ \diagdown OR_1\end{array}$$

wherein R stands for an aliphatic hydrocarbon radical with at least 10 carbon atoms and R₁ stands for alkyl, to react upon a diamino compound of the general formula:

$$\begin{array}{c}X_1\\ \diagdown\\ N-Y-NH_2\\ \diagup\\ X_2\end{array}$$

wherein X₁ and X₂ stand for hydrogen or alkyl and Y for an aliphatic radical containing two or three carbon atoms or a carbocyclic hydroaromatic radical containing the amino groups in ortho position.

2. The process which comprises causing a salt of an imino ether of a higher fatty acid of the general formula:

$$R-C\begin{array}{c}\diagup NH\\ \diagdown OR_1\end{array}$$

wherein R stands for an aliphatic hydrocarbon radical with at least 10 carbon atoms and R₁ stands for alkyl, to react at 150° C. upon a diamino compound of the general formula:

$$\begin{array}{c}X_1\\ \diagdown\\ N-Y-NH_2\\ \diagup\\ X_2\end{array}$$

wherein X₁ and X₂ stand for hydrogen or alkyl and Y for an aliphatic radical containing two or three carbon atoms or a carbocyclic hydroaromatic radical containing the amino groups in ortho position.

3. The process which comprises causing a salt of an imino ether of a higher fatty acid of the general formula:

$$R-C\begin{array}{c}\diagup NH\\ \diagdown OR_1\end{array}$$

wherein R stands for an aliphatic hydrocarbon radical with at least 10 carbon atoms and R₁ stands for alkyl, to react at 150° C. upon a diamino compound of the general formula:

$$\begin{array}{c}X_1\\ \diagdown\\ N-Y-NH_2\\ \diagup\\ X_2\end{array}$$

wherein X₁ and X₂ stand for hydrogen or alkyl, Y for an aliphatic radical containing two or three carbon atoms which may be substituted or not by the OH-group.

4. The process which comprises causing a salt of an imino ether of a higher fatty acid of the general formula:

$$R.C\begin{array}{c}\diagup NH\\ \diagdown OR_1\end{array}$$

wherein R stands for an aliphatic hydrocarbon radical with at least 10 carbon atoms and R₁ stands for alkyl to react in alcoholic solution upon a diamino compound of the formula:

$$\begin{array}{c}X_1\\ \diagdown\\ N-Y-NH_2\\ \diagup\\ X_2\end{array}$$

wherein X₁ and X₂ stand for hydrogen or alkyl, and Y for an aliphatic hydrocarbon radical containing two or three carbon atoms.

5. The process which comprises causing a salt of an imino ether of a higher fatty acid of the general formula:

$$R.C\begin{array}{c}\diagup NH\\ \diagdown OR_1\end{array}$$

wherein R stands for an aliphatic hydrocarbon radical with at least 10 carbon atoms and R₁ stands for alkyl to react in alcoholic solution upon ethylenediamine.

6. The condensation products formed of a salt of an imino ether of a higher fatty acid and a diamino compound, said new products containing the grouping:

$$R-C\begin{array}{c}\diagup N-CH-Y\\ \diagdown\qquad |\\ X-CH-Z\end{array}$$

wherein R stands for an aliphatic hydrocarbon radical with at least 10 carbon atoms and X for NH or O, Y stands for hydrogen and Z stands for hydrogen or $CH_2-N(C_2H_5)_2$, or Y and Z stand for the radical $$-CH_2-CH_2$$
$$-CH_2-CH_2$$

and being water-soluble in the form of their salts.

7. The condensation products formed of a salt of an imino ether of stearic acid and a diamino compound, said new products containing the grouping $$C_{17}H_{35}C\begin{array}{c}\diagup N-CH-Y\\ \diagdown\qquad |\\ X-CH-Z\end{array}$$

wherein X stands for NH or O, Y stands for hydrogen and Z stands for hydrogen or $$CH_2-N(C_2H_5)_2,$$

or Y and Z stand for the radical $$-CH_2-CH_2$$
$$-CH_2-CH_2$$

and being water-soluble in the form of their salts.

8. The compound of the following formula:

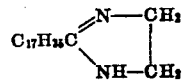

crystallizing from acetone in the form of laminæ melting at 93° C. to 95° C. and forming a hydrochloride of the melting point of 123° C.–125° C. which is soluble in water.

9. The process which consists in causing a salt of an imino ether of stearic acid of the general formula:

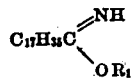

wherein $R_1$ stands for alkyl, to react in alcoholic solution upon ethylenediamine.

10. The process which consists in causing a hydrochloride of stearic imino ethylether to react in alcoholic solution upon ethylene diamine.

MAX BOCKMÜHL.
ROBERT KNOLL.